United States Patent
Kim et al.

(10) Patent No.: US 12,496,961 B2
(45) Date of Patent: Dec. 16, 2025

(54) MULTI-FUNCTION ASSEMBLY FOR VEHICLE

(71) Applicant: SL Corporation, Daegu (KR)

(72) Inventors: Jooyoung Kim, Gyeongsan-si (KR); Changwen An, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/593,899

(22) Filed: Mar. 2, 2024

(65) Prior Publication Data
US 2024/0367578 A1 Nov. 7, 2024

(30) Foreign Application Priority Data
May 3, 2023 (KR) .......................... 10-2023-0057398

(51) Int. Cl.
*B60Q 1/14* (2006.01)
*B60K 20/06* (2006.01)

(52) U.S. Cl.
CPC ............ *B60Q 1/1469* (2013.01); *B60K 20/06* (2013.01)

(58) Field of Classification Search
CPC ........ B60Q 1/1469; B60Q 1/12; B60Q 3/283; B60K 20/06; B62D 47/00; B62D 51/004
See application file for complete search history.

(56) References Cited

U.S. PATENT DOCUMENTS

| | | | | |
|---|---|---|---|---|
| 6,367,337 B1* | 4/2002 | Schlabach | ............... | G01L 5/221 180/443 |
| 6,403,899 B1* | 6/2002 | Fitzpatrick | ........... | B60Q 1/1461 200/61.54 |
| 6,444,929 B1* | 9/2002 | Schwartz | ............. | B60Q 1/1461 200/61.54 |
| 7,215,114 B2* | 5/2007 | Takuma | ................... | G01D 5/04 324/207.25 |
| 2003/0019113 A1* | 1/2003 | Kofink | .................. | B60R 16/027 33/534 |

FOREIGN PATENT DOCUMENTS

KR 101203689 B1 * 8/2010 ............. B60Q 3/283

* cited by examiner

*Primary Examiner* — Zakaria Elahmadi
(74) *Attorney, Agent, or Firm* — United One Law Group LLC; Kongsik Kim; Jhongwoo Peck

(57) ABSTRACT

A multi-function assembly for a vehicle includes a body that is disposed on a steering column and rotatably supports a steering wheel; a first cover coupled to one side of the body; a first substrate mounted on one side of the first cover, and through which a steering shaft passes; a shaft gear coupled to the steering shaft such that the shaft gear is rotated together with the steering wheel as the steering wheel rotates, the shaft gear being disposed on one side of the first substrate; a second substrate disposed to face the first substrate with the shaft gear as a center and configured to receive electrical power wirelessly from the first substrate and to transmit and receive control signals to and from the first substrate; and a first steering angle gear and a second steering angle gear disposed between the first cover and the first substrate to mesh with the shaft gear.

5 Claims, 8 Drawing Sheets

MULTI-FUNCTION ASSEMBLY FOR VEHICLE

CROSS-REFERENCE TO RELATED APPLICATION

This application claims priority from Korean Patent Application No. 10-2023-0057398 filed on May 3, 2023, which is incorporated herein by reference in its entirety.

BACKGROUND

1. Technical Field

The present disclosure relates to a multi-function assembly for a vehicle, which can perform various functions of a vehicle around the steering wheel of the vehicle.

2. Description of the Related Art

Typically, vehicles are equipped with a multi-function assembly disposed around the steering column that functions to operate turn signals or wipers.

In such multi-function assemblies, the left lever usually provides the function of turning on/off the turn signals, head lamps, high beam, fog lights, or the like, and the right lever provides the function of turning on/off the windshield wipers, operating the speed of the wipers, and spraying washer fluid.

Additionally, in recent years, airbags have been installed on the steering wheels, volume control switches and channel change switches for media control are provided, and cruise control switches are also provided.

However, in the process of supplying power or transmitting and receiving control signals between the steering wheel that rotates and the steering column that remains stationary, these various switches provided on the steering wheel can cause connection problems due to repetitive operations.

SUMMARY

The present disclosure is intended to solve this problem. More specifically, an object of the present disclosure is to provide a multi-function assembly for vehicles that can prevent disconnection of the connector for transmitting power to the switches on the steering wheel and receiving control signals therefrom by wirelessly transmitting both the control signals and the power between the steering wheel and the steering column.

The problems of the present disclosure are not limited to the problems mentioned above, and other problems not mentioned will be clearly understood by those skilled in the art from the description below.

In order to achieve the above object, according to the present disclosure, a multi-function assembly for a vehicle may include a body that is disposed on a steering column of the vehicle and rotatably supports a steering wheel of the vehicle; a first cover coupled to one side of the body; a first substrate mounted on one side of the first cover, and through which a steering shaft passes; a shaft gear coupled to the steering shaft such that the shaft gear is configured to rotate together with the steering shaft when the steering wheel rotates, the shaft gear being disposed on one side of the first substrate; a second substrate disposed on an opposite side of the first substrate with respect to the shaft gear and configured to receive electrical power wirelessly from the first substrate and to transmit and receive control signals to and from the first substrate; and a first steering angle gear and a second steering angle gear disposed between the first cover and the first substrate to mesh with the shaft gear.

The first steering angle gear may include a first accommodation portion that protrudes from a rotation center thereof toward the first cover, a first magnetic material disposed inside the first accommodation portion, and a first tooth pattern provided on an outer periphery thereof to mesh with the shaft gear. The second steering angle gear may include a second accommodation portion that protrudes from a rotation center thereof toward the first cover, a second magnetic material disposed inside the second accommodation portion, and a second tooth pattern provided on an outer periphery thereof to mesh with the shaft gear. Further, the first steering angle gear and the second steering angle gear may rotate in the same direction as the shaft gear rotates.

The first substrate may include a first sensor and a second sensor provided at positions that correspond to the first magnetic material and the second magnetic material, respectively, and the first sensor and the second sensor may detect a rotation angle of the steering wheel by detecting rotation angles of the first steering angle gear and the second steering angle gear.

The first steering angle gear and the second steering angle gear may rotate at different rates in response to rotation of the shaft gear.

The first steering angle gear may include a first guide portion that protrudes annularly around the first accommodation portion, and the second steering angle gear may include a second guide portion that protrudes annularly around the second accommodation portion. Correspondingly, a first guide groove and a second guide groove may be formed on the one side of the first cover, into which the first guide portion and the second guide portion are rotatably inserted.

The shaft gear may include a flange portion configured to be disposed on the one side of the first substrate, a first protrusion that protrudes from a central area of the flange portion to one side and penetrates a center of the second substrate, a second protrusion that protrudes from the central area of the flange portion to the other side and penetrates a center of the first substrate, a third tooth pattern provided to mesh simultaneously with the first steering angle gear and the second steering angle gear on an outer periphery of the second protrusion, and a third guide portion that protrudes from the second protrusion adjacent to the third tooth pattern to correspond to a third guide groove formed on the one side of the first cover.

The multi-function assembly may further include a second cover that is coupled to the first cover to accommodate the first substrate, the second substrate, and the shaft gear between the first cover and the second cover.

The multi-function assembly may further include a third cover fixed to one side of the flange portion of the shaft gear and inserted so that the first protrusion of the shaft gear penetrates a central area of the third cover, and may include a connector for connecting the electrical power and/or the control signals to the steering wheel on one side thereof.

The multi-function assembly may further include a shift lever movably coupled to the body. The shift lever may be configured to be switched to a drive mode (D), a reverse mode (R), or a neutral mode (N) by rotating to different positions, and may be configured to be switched to a parking mode (P) by pressing a button.

The multi-function assembly may further include a shift lever movably coupled to the body. In response to the shift lever being pulled toward a driver or pushed in an opposite direction, a drive mode (D) or a reverse mode (R) may be selected, in response to the shift lever being rotated upward, a neutral mode (N) may be selected, and in response to a button being pressed, a parking mode (P) may be selected.

The multi-function assembly for a vehicle according to embodiments of the present disclosure can provide the following advantages.

First, since the first substrate provided on the steering column and the second substrate provided on the steering wheel can wirelessly supply power therebetween and transmit/receive control signals at the same time, entanglement or disconnection of wires between them can be prevented as the steering wheel rotates.

Second, since the first steering angle gear and the second steering angle gear rotate in the same direction but at different angles or rates, the rotation and alignment state of the steering wheel can be accurately identified via the first sensor and second sensor that are respectively provided on the first substrate.

Third, by improving the operating direction and installation location of the shift lever, the operation of the shift lever may become more intuitive.

The effects of the present disclosure are not limited to the effects mentioned above, and other effects not mentioned will be clearly understood by those skilled in the art from the disclosure.

BRIEF DESCRIPTION OF THE DRAWINGS

The summary set forth above as well as the detailed description of the exemplary embodiments of the present disclosure set forth below may be better understood when read in conjunction with the accompanying drawings. Exemplary embodiments are shown in the drawings for the purpose of illustrating the disclosure. However, it should be understood that the present disclosure is not limited to the exact arrangement and means shown.

DETAILED DESCRIPTION

Figure 1:
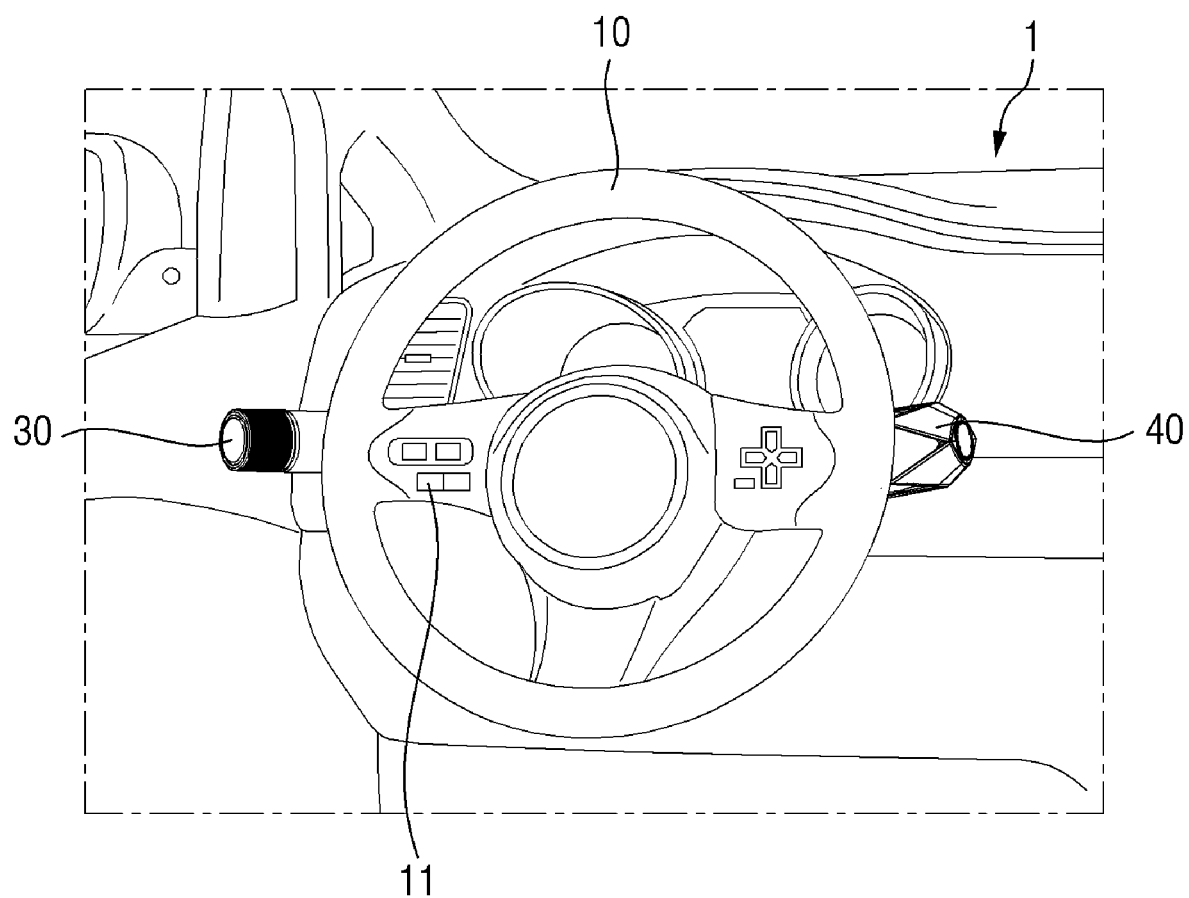
FIG. 1 is a perspective view showing a state, in which a multi-function assembly for a vehicle according to an embodiment of the present disclosure is mounted on a vehicle.

Below, exemplary embodiments of the present disclosure are described in detail with reference to the attached drawings. The benefits and features of the present disclosure and the methods to achieve them will become clear when referring to the detailed embodiments along with the attached drawings. However, the present disclosure is not limited to the embodiments disclosed below and can be implemented in various different forms. The embodiments are provided solely to make the disclosure more thorough and to fully inform a person with ordinary skill in the art, and the invention is defined only by the scope of the claims. Throughout the specification, identical reference numbers refer to identical components.

The present disclosure is subject to various modifications and can have multiple embodiments; specific embodiments are exemplified and described in the drawings. However, this is not intended to limit the present disclosure to specific embodiments. Rather, it should be understood to include all modifications, equivalents, or substitutes falling within the idea and technical scope of the present disclosure.

Terms that include ordinals such as "first," "second," etc., may be used to describe various components, but the components are not limited by these terms. These terms are used only to distinguish one component from another. For example, without departing from the scope of the present disclosure, a second component may be termed a first component, and similarly, a first component may be termed a second component.

The term "and/or" includes any combination of the listed related items or any of the related items.

When it is mentioned that one component is "connected to" or "coupled with" another component, it should be understood that it may be directly connected or coupled to the other component, or there may be another component in between. On the other hand, when it is mentioned that one component is "directly connected to" or "directly coupled with" another component, it should be understood that there are no other components in between.

The terms used in this application are only for describing particular embodiments and are not intended to limit the disclosure.

Singular expressions, unless explicitly stated otherwise in context, include plural expressions.

In this application, terms such as "include" or "have" are used to indicate the existence of the features, numbers, steps, operations, components, parts, or combinations thereof stated in the specification, and do not preclude the existence or addition of one or more other features, numbers, steps, operations, components, parts, or combinations thereof.

Embodiments of the present disclosure will hereinafter be described with reference to the accompanying drawings. The same reference numerals are assigned to identical or corresponding components, regardless of the drawing numbers, and redundant descriptions thereof are omitted.

Figure 2:
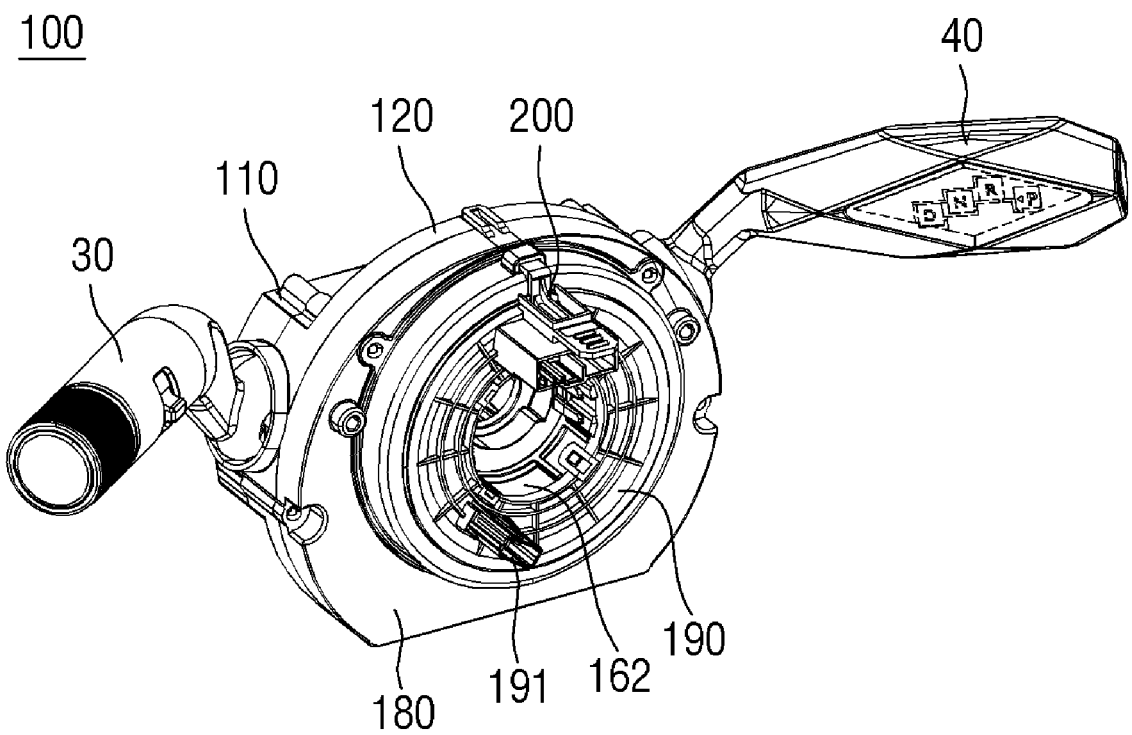
FIG. 2 is an exploded perspective view showing the multi-function assembly for a vehicle according to an exemplary embodiment shown in FIG. 1.

FIG. 1 is a perspective view showing a vehicle multi-function assembly mounted on a vehicle according to an embodiment of the present disclosure, and FIG. 2 is an exploded perspective view showing the vehicle multi-function assembly shown in FIG. 1.

Figure 6:
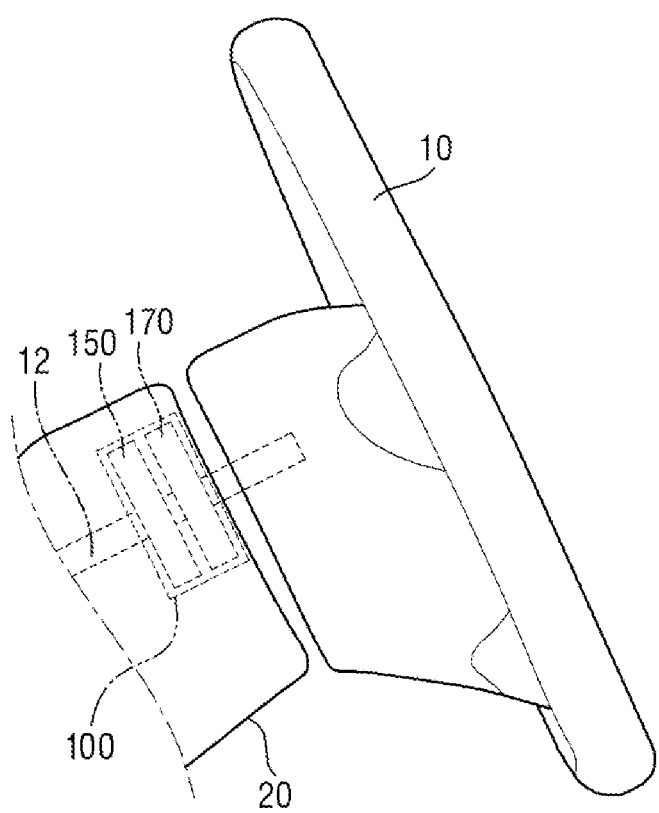
FIG. 6 is a reference diagram showing the positions of the first substrate and the second substrate between the steering wheel and steering column of the vehicle according to an exemplary embodiment of the present disclosure.

Referring to FIGS. 1 and 2, the multi-function assembly 100 for a vehicle according to an embodiment of the present disclosure may be installed across the interface between the steering wheel 10 and the steering column 20 of the vehicle (see FIG. 6). Here, the vehicle multi-function assembly 100 may be disposed at the end of the steering column 20, and may function as a switching device for various functions via a left lever 30 and a right lever 40. Further, the vehicle multi-function assembly 100 may also function as a sensor that senses the alignment state (e.g., orientation or steering angle) of the steering wheel 10 by detecting the rotation angle of the steering wheel 10 with respect to the steering column 20.

In an embodiment of the present disclosure, the multi-function assembly 100 for a vehicle may include a left lever 30 and a right lever 40. The left lever 30 may provide a light switching function and a windshield wiper switching function.

The light switching function may correspond to the stepwise turning on/off of head lamps and tail lamps, and may allow the lamps such as turn signal lights, fog lights, and high beams to be turned on or off.

In addition, the wiper switching function may operate the windshield and rear window wipers on/off and may also control the operating speed of the wipers stepwise. Additionally, the left lever 30 may control the washer fluid spray function.

In addition, the right lever 40 may be implemented as a shift lever that changes the vehicle's shift mode into drive, reverse, neutral, or parking modes. A detailed explanation of the operation of the shift lever will be provided later below.

Additionally, various switches may be provided on the steering wheel 10. For example, an audio volume control switch or a mute switch for controlling the volume of media or navigation system, a channel change switch for navigating through the playlist or radio stations, a voice recognition switch, a call connection or termination switch, and a switch for changing instrument panel settings, a cruise control switch, a driving assistance switch, a switch for setting the distance between vehicles, or the like may be provided.

The switches provided on the steering wheel 10 may only activate the switching function on the steering wheel 10 when power is supplied to the steering wheel 10 from the vehicle, and also, may transmit or receive switching control signals to or from the vehicle. As such, a connector or a wire that transmits and receives power of the switches and control signals between the rotating steering wheel 10 and the stationary steering column 20 may experience separation or disconnection. On the other hand, the multi-function assembly for a vehicle 100 of the present disclosure may prevent such a connector separation or disconnection from occurring by utilizing the wireless charging (e.g., wireless electrical power transmission) technique. Additionally, the vehicle multi-function assembly 100 may detect the rotation state (e.g., the degree of rotation) of the steering wheel 10 to check the orientation of the steering wheel 10.

Figure 3:
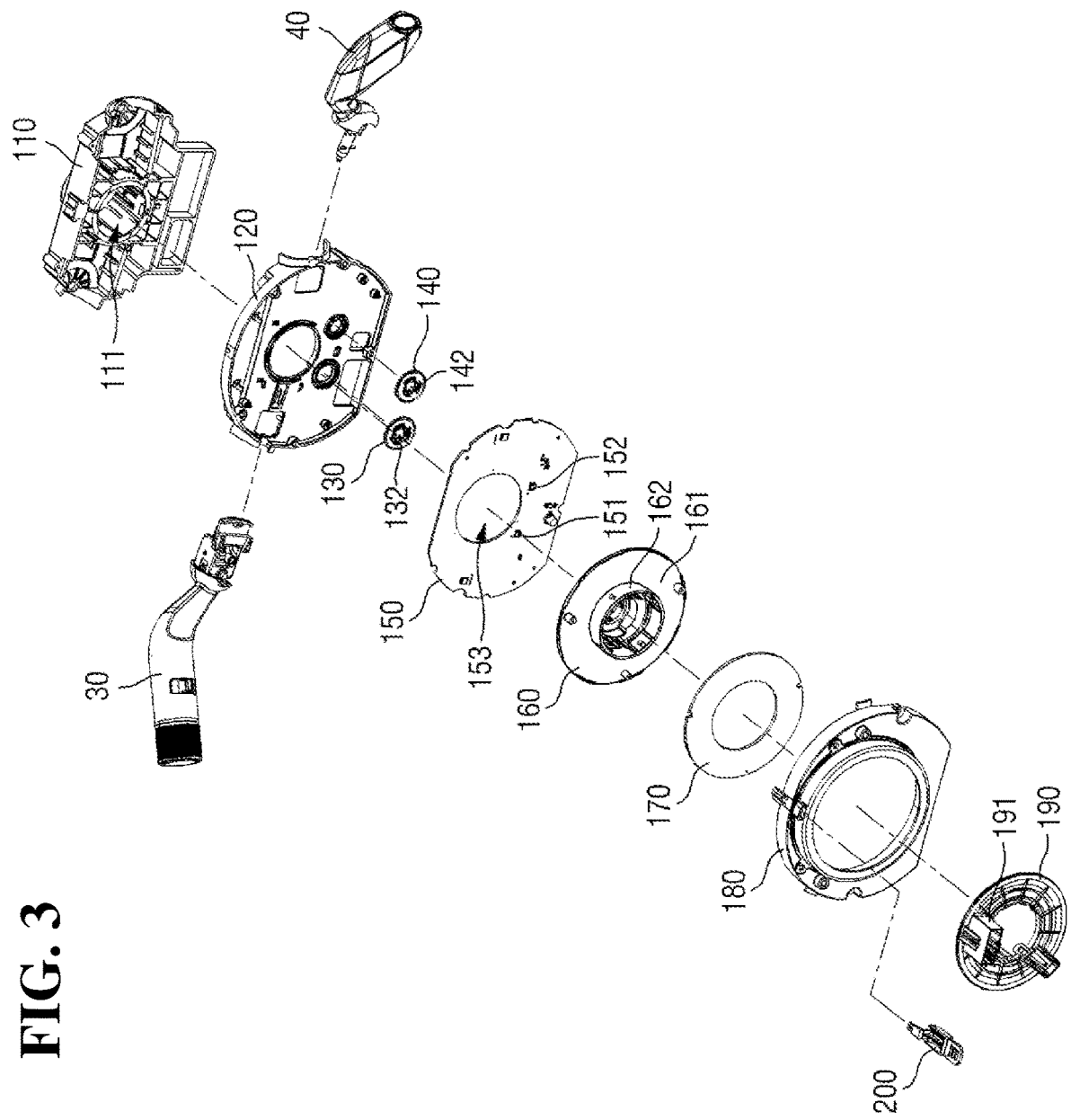
FIG. 3 is an exploded perspective view showing the multi-function assembly for a vehicle according to an exemplary embodiment shown in FIG. 2.
Figure 4:
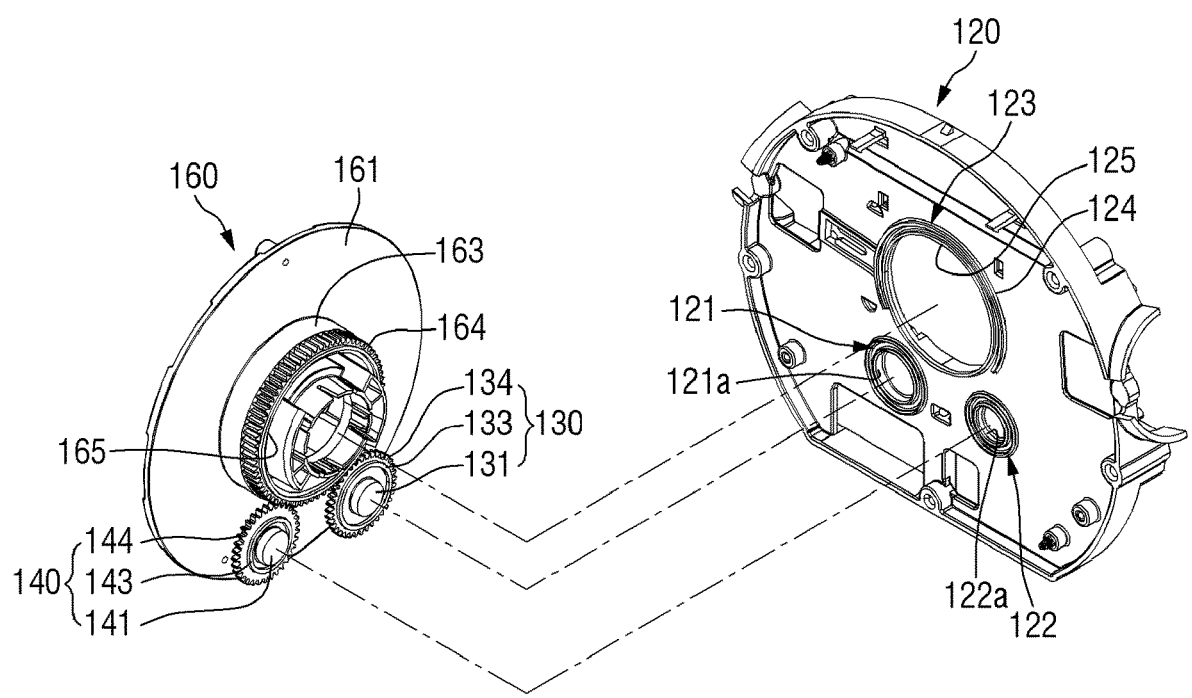
FIG. 4 is an assembly diagram showing a position where a shaft gear and steering angle gears are coupled on the first cover of the multi-function assembly for a vehicle according to an exemplary embodiment shown in FIG. 3.
Figure 5:
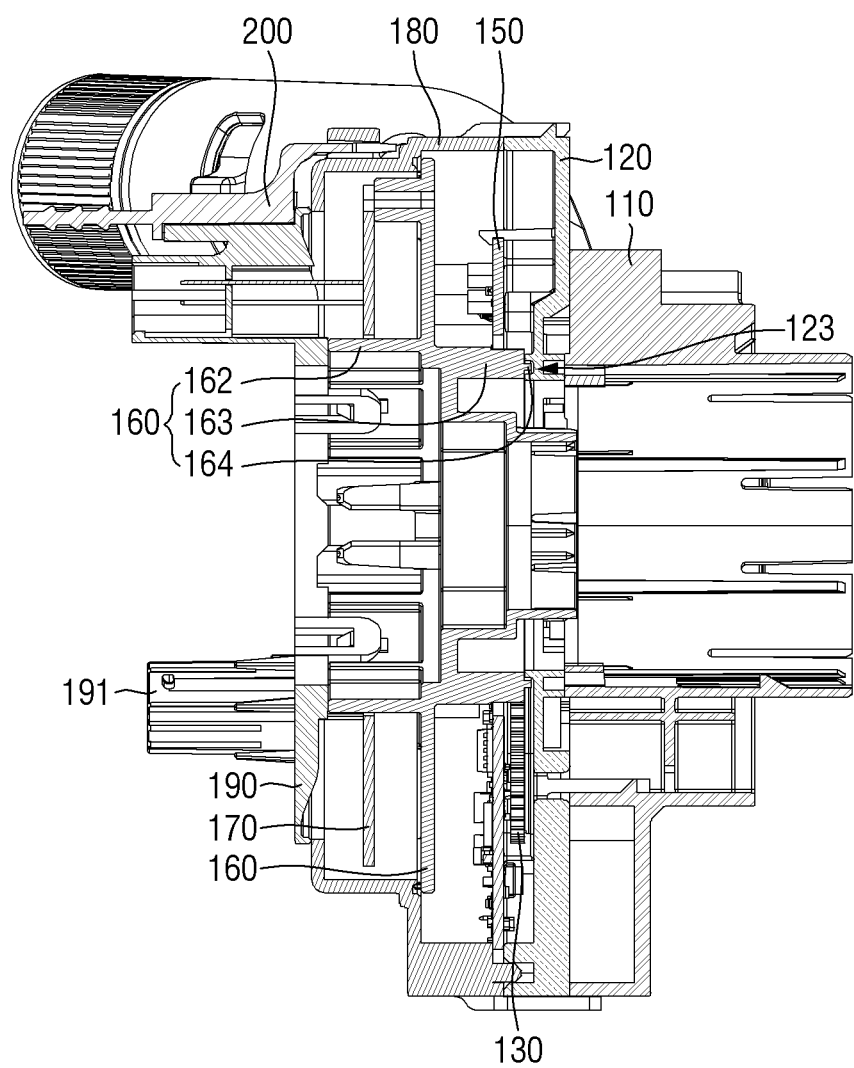
FIG. 5 is a longitudinal cross-sectional view showing the multi-function assembly for a vehicle according to an exemplary embodiment shown in FIG. 3.

FIG. 3 is an exploded perspective view showing the multi-function assembly for a vehicle shown in FIG. 2, and FIG. 4 shows an assembly diagram showing a position where a shaft gear 160 and steering angle gears are coupled on the first cover 120 of the multi-function assembly for a vehicle shown in FIG. 3. FIG. 5 is a longitudinal cross-sectional view showing the multi-function assembly for a vehicle shown in FIG. 3, and FIG. 6 is a reference diagram showing the positions of the first substrate 150 and the second substrate 170 between the steering wheel and the steering column of the vehicle.

Referring to FIGS. 3 to 6, the multi-function assembly 100 for a vehicle may include a body 110, a first cover 120, a first steering angle gear 130, a second steering angle gear 140, and a first substrate 150, a shaft gear 160, a second substrate 170, a second cover 180, and a third cover 190.

First, the body 110 may be installed at the front end (e.g., an end that is proximate to the driver) of the steering column 20 of the vehicle. A left lever 30 may be rotatably installed on the left side of the body 110, and a right lever 40 may be rotatably installed on the right side of the body 110. The left lever 30 and the right lever 40 may be implemented as a toggle switch type. An aperture 111 into which the shaft of the steering wheel 10 is inserted may be formed in the central area of the body 110. The aperture 111 may be also formed in the corresponding central regions in the first cover 120, the first substrate 150, the shaft gear 160, the second substrate 170, the second cover 180, and the third cover 190.

A first cover 120 may be coupled to one side of the body 110. The first cover 120 may include a first substrate 150 installed on one side. Additionally, the first steering angle gear 130 and the second steering angle gear 140 may be installed on one side of the first cover 120 between the first substrate 150 and the first cover 120.

A first guide groove 121 and a second guide groove 122 may be formed on one side of the first cover 120 so that the first steering angle gear 130 and the second steering angle gear 140 may be installed to be rotatable. The first guide groove 121 and the second guide groove 121 may be formed in different sizes depending on the sizes of the first steering angle gear 130 and the second steering angle gear 140, respectively. Each of the first guide groove 121 and the second guide groove 122 may have a groove structure, in which a portion of the first cover 120 is recessed inward so that each of the steering angle gears 130 and 140 may be partially inserted, or may have a structure, in which a space, into which each of the steering angle gears 130 and 140 may be inserted, is formed between two steps protruding along a concentric circle on one side of the first cover 120. In this embodiment, each steering angle gear may be installed to be rotatable through the latter step structure. The first guide groove 121 and the second guide groove 122 may have the same structure with different sizes.

In addition, a third guide groove 123 may be formed on one side of the first cover 120 so that the shaft gear 160 may be installed to be rotatable. The third guide groove 123 may have a similar or substantially the same structure as the first guide groove 121 and the second guide groove 122 described above. However, the third guide groove 123 may have a larger diameter than the first guide groove 121 and the second guide groove 122 due to the size of the shaft gear 160, and may have a structure, in which the steps 124 disposed on the outside of the steps forming a concentric circle are partially omitted or partially cut out so as not to interfere with the rotation of the first steering angle gear 130 and the second steering angle gear 140. In this embodiment, the inner step 125 and the outer step 124 of the third guide groove 123 may be arranged concentrically, and among these, the outer step 124 may be formed in a structure, in which the area adjacent to the first guide groove 121 and the second guide groove 122 is partially omitted.

The other side of the first cover 120 may be coupled to face one side of the body 110, and curved lines or curved areas may be provided on both sides of the first cover 120, which are formed in accordance with the coupling area of the left lever 30 and the right lever 40 that are coupled between the body 110 and the first cover 120.

Further, the first steering angle gear 130 may include a first accommodation portion 131 that protrudes from the rotation center thereof toward the first cover 120, a first magnetic material 132 disposed inside the first accommodation portion 131, a first guide portion 133 that protrudes in an annular shape around the first accommodation portion 131, and a first tooth pattern 134 provided on the outer periphery to be engaged with the shaft gear 160. In addition, the second steering angle gear 140 may include a second accommodation portion 141 that protrudes from the rotation center thereof toward the first cover 120, a second magnetic material 142 disposed inside the second accommodation portion 141, a second guide portion 143 that protrudes in an annular shape around the second accommodation portion 141, and a second tooth pattern 144 provided on the outer periphery to be engaged with the shaft gear 160.

The first accommodation portion 131 and the second accommodation portion 141 may each be inserted inside an inner step 121a of the first guide groove 121 and an inner step 122a of the second guide groove 122 on the first cover 120.

The first magnetic material 132 and the second magnetic material 142 may be arranged to respectively correspond to a first sensor 151 and a second sensor 152 provided on the first substrate 150, which will be described later below. The first magnetic material 132 and the second magnetic material 142 may change phase due to the polarity of the N and S poles, respectively, according to the rotation of the shaft gear 160, and the first sensor 151 and the second sensor 152 may detect this phase changes.

The first guide portion 133 and the second guide portion 143 may be inserted into the first guide groove 121 and the second guide groove 122, respectively. Accordingly, the first steering angle gear 130 and the second steering angle gear 140 may be arranged to be rotatable while each guide portion is inserted into the guide groove, and positional (e.g., translational) movement in the lateral direction while rotating can be prevented.

Here, the first steering angle gear 130 may have a larger diameter than the second steering angle gear 140, and when the second steering angle gear 130 engages with the shaft gear 160 and rotates, it may be configured to rotate more than the first steering angle gear 130. In other words, the gear ratio of the first tooth pattern 134 compared to the third tooth pattern 164 formed on the shaft gear 160 may be formed to be lower than the gear ratio of the second tooth pattern 144. For example, when the shaft gear 160 rotates one revolution, the number of rotations of the second steering angle gear 140 relative to the first steering angle gear 130 may be set to 2:3. However, the gear ratio of the first steering angle gear 130 and the second steering angle gear 140 with respect to the shaft gear 160 is not limited thereto. In some embodiments, the second steering angle gear 140 may be configured to have a larger diameter than the first steering angle gear 130.

In addition, the first substrate 150 may be implemented as a main PCB board, and it may include electronic components and circuits configured to measure the rotation angle or amount of rotation of the steering wheel 10 via the first sensor 151 and the second sensor 152 and to transmit this information to the vehicle's electronic control device. Additionally, the first substrate 150 may be configured to receive control signals from the left lever 30 and the right lever 40 described above.

The first sensor 151 and the second sensor 152 may be disposed on surfaces that face the first steering angle gear 130 and the second steering angle gear 140, respectively. The first sensor 151 and the second sensor 152 may be implemented with a steering angle sensor (SAS).

Additionally, in the first substrate 150, a Steering Roll Connector (SRC) pin 200, which will be described later below, may receive a signal according to the neutral state of the first steering angle gear 130 and the second steering angle gear 140.

In addition, the shaft gear 160 may include a flange portion 161 to be disposed on one side of the first substrate 150, a first protrusion 162 that protrudes to one side from the flange portion 161 and penetrates the center of the second substrate 170, a second protrusion 163 that protrudes from the flange portion 161 to the other side and penetrates the center of the first substrate 150, a third tooth pattern 164 formed at the outer periphery of the second protrusion 163 to mesh with the first steering angle gear 30 and the second steering angle gear 140, and a third guide portion 165 that protrudes from the front end of the second protrusion 163 to correspond to the third guide groove 123.

The flange portion 161 may have a substantially thin donut-shaped disk structure, and the second substrate 170 may be coupled to one side thereof.

The first protrusion 162 and/or the second protrusion 163 may be coupled to the shaft 12 of the steering wheel 10 and may be disposed to allow the shaft gear 160 to rotate in response to the rotation of the shaft 12.

The second protrusion 163 may be inserted into an aperture 153 of the first substrate 150 and may be disposed to allow the third tooth pattern 164 to be engaged with the first tooth pattern 134 and the second tooth pattern 144.

Additionally, the second substrate 170 may transmit signals for the switches to the first substrate 150 when various switches 11 of the steering wheel 10 operate. For wireless transmission of signals, various wireless technologies may be utilized. By way of example, short-range transmission technologies such as Bluetooth, Wi-Fi, NearLink, near-field communication (NFC), LPWAN, ultra-wideband (UWB), IEEE 802.15.4 (e.g., Zigbee), or the like may be used. Additionally, the second substrate 170 may transmit control signals according to the operation of the airbag and the heating wire of the steering wheel 10 from the first substrate 150. Additionally, it may include a coil that receives power transmitted wirelessly from the first substrate 150. To this end, the first substrate 150 and the second substrate 170 may include coils that are inductively coupled so that they can wirelessly transmit electrical power therebetween.

Further, the second cover 180 may be coupled to the first cover 120. The second cover 180 may form an accommodation space between the first cover 120 and the second cover 180 to accommodate the first substrate 150, shaft gear 160, and second substrate 170 therein. Here, the shaft gear 160 and the second substrate 170 may be arranged to be rotatable according to the rotation of the steering shaft 12 within the accommodation space.

A third cover 190 may be coupled to the first protrusion 162. Accordingly, the third cover 190 may be arranged to be rotatable together with the shaft gear 160. The third cover 190 may be provided with a connector 191 on one side thereof to connect power and/or control signals to the steering wheel 10.

A steering roll connector (SRC) pin 200 may be coupled to the third cover 190. The SRC pin 200 may be removed after the assembly of the vehicle multi-function assembly 100 and the steering wheel 10 is completed.

For example, when the first steering angle gear 130, the second steering angle gear 140, and the shaft gear 160 are aligned in a neutral position, the SRC pin 200 may maintain their neutral state. The first substrate 150 may detect a misassembly by checking their neutral states. Further, this misassembly condition may be corrected using a zero point correction (e.g., a calibration).

Figure 7:
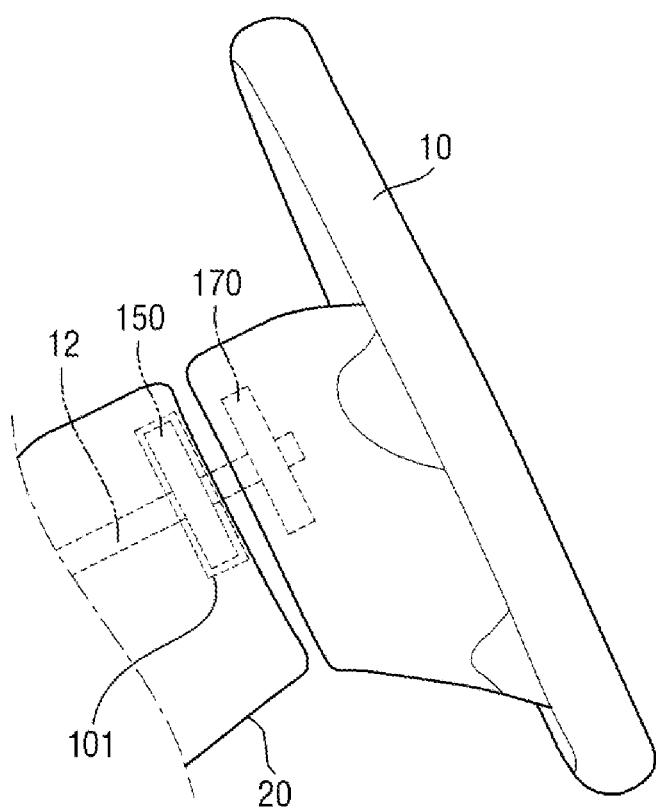
FIG. 7 is a reference diagram showing another embodiment for the positions of the first substrate and the second substrate between the steering wheel and steering column of the vehicle according to the present disclosure.

FIG. 7 is a reference diagram showing another embodiment of the positions of the first substrate and the second substrate between the steering wheel and steering column of the vehicle. Use of the same reference numerals below indicates similar or substantially the same components.

Referring to FIG. 7, in the multi-function assembly 101 for a vehicle according to another embodiment of the present disclosure, the second substrate 170 may be disposed on the steering wheel 10 side.

As such, the second substrate 170 may maintain a distance from the first substrate 150 at which power and control signals may be transmitted wirelessly, and may have a structure that can rotate together with the steering shaft 12 while being located in an area other than the accommodation space between the first cover 120 (see FIG. 3) and the second cover 180 (see FIG. 3). In this configuration, the second cover 180 and the third cover 190 (see FIG. 3) may be omitted, and the lower area of the steering wheel 10 may replace the function of the omitted configuration. In some embodiments, a shielding means may be provided to electromagnetically shield the vehicle multi-function assembly 101 and/or the spaced area between the steering column 20 and the steering wheel 10.

In addition, the shaft gear 160 (see FIG. 3) and the second substrate 170 may be arranged to be spaced apart from each other, or the first protrusion 162 (see FIG. 3) of the shaft gear 160 may have a structure that extends inside the steering wheel 10 together with the steering shaft 12.

Figure 8:
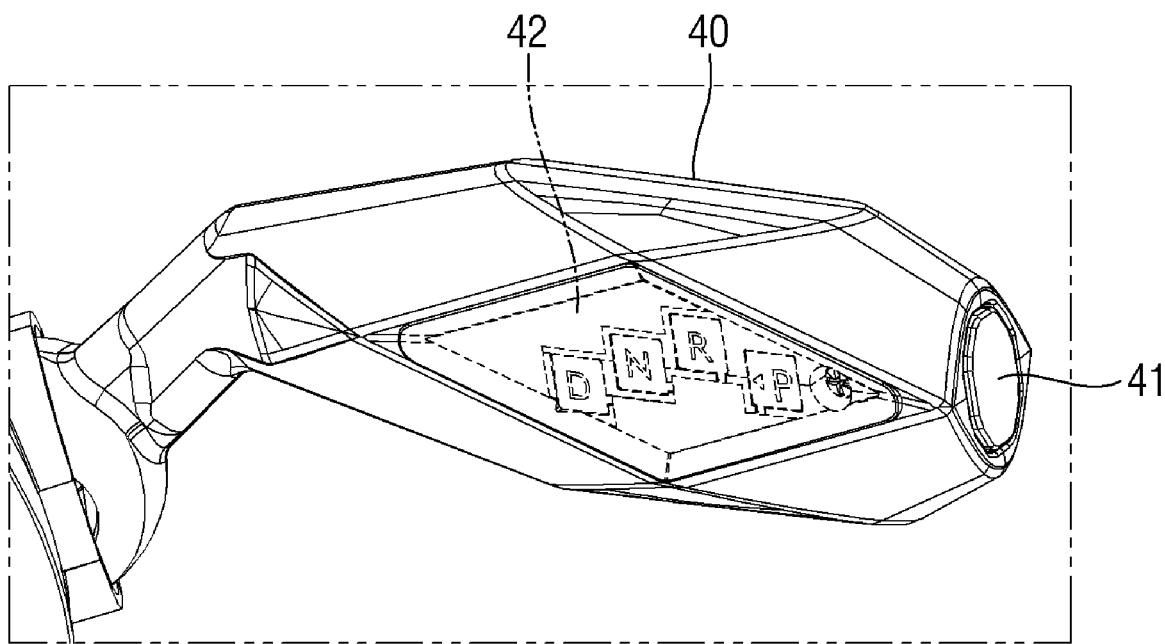
FIG. 8 is a reference diagram showing a shift lever of the multi-function assembly for a vehicle according to an exemplary embodiment shown in FIG. 2.
Figure 8:
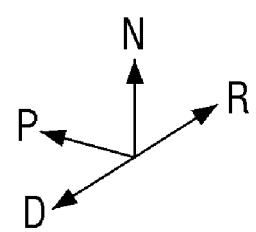

FIG. 8 is a reference diagram showing a shift lever of the multi-function assembly for a vehicle shown in FIG. 2. Referring to FIG. 8, the shift lever, as the right lever 40, may be disposed on the right side of the multi-function assembly for a vehicle.

The shift lever may switch the transmission modes of the vehicle between drive (D), reverse (R), neutral (N), and parking (P), and may transmit the corresponding control signal to the first substrate 150.

For example, the shift lever may be switched to any one of drive mode (D) that allows the vehicle to move forward, reverse mode (R) that allows the vehicle to reverse, neutral mode (N) that keeps the engine or motor in a neutral state, or parking mode (P) that is used when the vehicle is parked.

The shift lever may be switched to any of drive mode (D), reverse mode (R), or neutral mode (N) by rotation, and may be switched to parking mode (P) upon pressing of a button 41. In order words, the shift lever may be arranged to be rotatable in the up/down (e.g., about an axis parallel with the steering axis) and forward/backward directions (e.g., about an axis that is perpendicular to the steering axis), and may be provided with a push switch for parking mode (P). In some embodiments, the shift lever may include no button 41 for parking mode (P), and the shift lever itself may be operated by moving elastically inside the steering column 20 (see FIG. 6) in its lengthwise direction. In some other embodiments, the parking mode button 41 may be provide elsewhere other than the shift lever.

By way of example, the shift lever may be switched to drive mode (D) when the shift lever is pulled toward the driver, to reverse mode (R) when pushed away from the driver, and to neutral mode (N) when rotated upward (e.g., counter-clockwise).

Additionally, the shift lever may include a display unit 42 so that the driver can check the changed state according to each mode. For example, the display unit 42 may illuminate an area that corresponds to one of the D, N, R, or P shifting modes, or display any one of these shifting modes, depending on the state in which the shift lever is switched.

Therefore, with the multi-function assembly for a vehicle according to an embodiment of the present disclosure, since the first substrate provided on the steering column and the second substrate coupled to the steering wheel can wirelessly supply power to each other and simultaneously transmit and receive control signals, while the steering wheel rotates, it is possible to prevent disconnection between them. Further, since the first steering angle gear and the second steering angle gear rotate in the same direction but at different angles or rates, the rotation and alignment state of the steering wheel can be more accurately identified via the first sensor and the second sensors respectively provided on the first substrate. Further, the operating direction and installation location of the shift lever can be improved, which has the effect of making the operation more intuitive.

Embodiments of the present disclosure have been described with reference to the accompanying drawings. However, it should be understood that the present disclosure is not limited to these embodiments, and can be implemented in various other forms. Those skilled in the art to which the present disclosure pertains, with ordinary knowledge in the field, will understand that the technical concepts or essential features of the present disclosure can be implemented in different specific forms without altering their essence. Therefore, the embodiments described above should be considered exemplary and not restrictive in any way.

What is claimed is:

1. A multi-function assembly for a vehicle comprising:
a body that is disposed on a steering column of the vehicle and rotatably supports a steering wheel of the vehicle;
a first cover coupled to one side of the body;
a first substrate mounted on one side of the first cover, and through which a steering shaft passes;
a shaft gear coupled to the steering shaft such that the shaft gear is rotated with the steering wheel as the steering wheel rotates, the shaft gear being disposed on one side of the first substrate;
a second substrate disposed on an opposite side of the first substrate with respect to the shaft gear and configured to receive electrical power wirelessly from the first substrate and to transmit and receive control signals to and from the first substrate; and
a first steering angle gear and a second steering angle gear disposed between the first cover and the first substrate to mesh with the shaft gear,
wherein the first steering angle gear comprises a first accommodation portion that protrudes from a rotation center thereof toward the first cover, a first magnetic material disposed inside the first accommodation portion, and a first tooth pattern provided on an outer periphery thereof to mesh with the shaft gear,
wherein the second steering angle gear comprises a second accommodation portion that protrudes from a rotation center thereof toward the first cover, a second magnetic material disposed inside the second accommodation portion, and a second tooth pattern provided on an outer periphery thereof to mesh with the shaft gear,
wherein the first steering angle gear and the second steering angle gear rotate in the same direction as the shaft gear rotates,
wherein the first steering angle gear includes a first guide portion that protrudes annularly around the first accommodation portion, wherein the second steering angle gear includes a second guide portion that protrudes annularly around the second accommodation portion, wherein a first guide groove and a second guide groove are formed on the one side of the first cover, into which the first guide portion and the second guide portion are rotatably inserted, and wherein the shaft gear comprises, a flange portion configured to be disposed on the one side of the first substrate;

a first protrusion that protrudes from a central area of the flange portion to one side and penetrates a center of the second substrate;

a second protrusion that protrudes from the central area of the flange portion to the other side and penetrates a center of the first substrate;

a third tooth pattern provided to mesh simultaneously with the first steering angle gear and the second steering angle gear on an outer periphery of the second protrusion; and a third guide portion that protrudes from the second protrusion adjacent to the third tooth pattern to correspond to a third guide groove formed on the one side of the first cover.

2. The multi-function assembly of claim 1, further comprising:

a second cover that is coupled to the first cover to accommodate the first substrate, the second substrate, and the shaft gear between the first cover and the second cover.

3. The multi-function assembly of claim 2, further comprising:

a third cover fixed to one side of the flange portion of the shaft gear and inserted so that the first protrusion of the shaft gear penetrates a central area of the third cover, and including a connector for connecting the electrical power and/or the control signals to the steering wheel on one side thereof.

4. The multi-function assembly of claim 1, further comprising:

a shift lever movable coupled to the body, wherein the shift lever is configured to be switched to a drive mode, a reverse mode, or a neutral mode, by rotating to different positions, and to be switched to a parking mode by pressing a button.

5. The multi-function assembly of claim 1, further comprising:

a shift lever movable coupled to the body, wherein in response to the shift lever being pulled toward a driver or pushed in an opposite direction, a drive mode or a reverse mode is selected, in response to the shift lever being rotated upward, a neutral mode is selected, and in response to a button being pressed, a parking mode is selected.

* * * * *